United States Patent [19]

Frazee

[11] Patent Number: 4,923,919

[45] Date of Patent: * May 8, 1990

[54] PRESSURE SENSITIVE ADHESIVE COMPOSITIONS

[75] Inventor: Glenn R. Frazee, Kenosha County, Wis.

[73] Assignee: S. C. Johnson & Son, Inc., Racine, Wis.

[ * ] Notice: The portion of the term of this patent subsequent to Nov. 7, 2006 has been disclaimed.

[21] Appl. No.: 320,349

[22] Filed: Mar. 8, 1989

Related U.S. Application Data

[63] Continuation-in-part of Ser. No. 119,282, Nov. 4, 1987, Pat. No. 4,845,149, which is a continuation of Ser. No. 899,282, Aug. 22, 1986, abandoned.

[51] Int. Cl.$^5$ ................................................ C08F 2/16
[52] U.S. Cl. ..................................... 524/460; 524/457; 524/458; 526/203; 427/208.4
[58] Field of Search ....................... 524/460, 457, 458; 526/203; 427/208.4

[56] References Cited

U.S. PATENT DOCUMENTS 4,668,730  5/1987  Iovine et al. .......................... 526/201

FOREIGN PATENT DOCUMENTS 0258753  8/1987  European Pat. Off. .
47-606    1/1972  Japan .

Primary Examiner—Joseph L. Schofer
Assistant Examiner—N. Sarofim

[57] ABSTRACT

Emulsion polymer pressure-sensitive adhesives having substantially Newtonian-like flow characteristics are disclosed.

8 Claims, No Drawings

PRESSURE SENSITIVE ADHESIVE COMPOSITIONS

REFERENCE TO RELATED APPLICATIONS

This application is a continuation-in-part of patent application Ser. No. 119,282 filed Nov. 4, 1987, now U.S. Pat. No. 4,845,149 which, in turn is a continuation of patent application Ser. No. 899,282 filed Aug. 22, 1986 (now abandoned), the benefit of which is now claimed for purposes of priority pursuant to 35 USC § 120.

BACKGROUND OF THE INVENTION

The present invention relates to pressure sensitive adhesive compositions, and to the methods to produce them. In particular, an acrylic emulsion polymer is employed as the polymeric component of a pressure sensitive adhesive formulation. The acrylic emulsion polymer has substantially Newtonian-like flow characteristics.

Pressure sensitive adhesives (PSAs) are a class of adhesive compositions which are applied with pressure, usually finger pressure, and generally do not undergo a liquid to solid transition in order to hold materials together. PSAs can be solvent-free natural or synthetic resins having a viscoelastic property termed tack. Tack is a property characterized by the rapid wetting of a substrate by a polymer to form an adhesive bond upon brief contact with the substrate under light pressure. Typical applications for PSAs include pressure-sensitive tapes, labels, decals, decorative vinyls, laminates, wall coverings and floor tiles.

The early pressure sensitive tapes used adhesives that were based on organic solvent solutions of natural or synthetic rubber, tackified by a resinous material. Later, the rubber in pressure sensitive adhesives was replaced with styrene-butadiene block copolymers. More recently, the polyacrylates have gained wide acceptance in pressure sensitive adhesive formulations due to their clarity and resistance to oxidation and sunlight.

Acrylic copolymer PSAs are available as solution or aqueous emulsion polymers. The solution polymers have the disadvantages of low molecular weight due to chain transfer during the polymerization, viscous solutions at higher molecular weights, and the need for elaborate coating processes and solvent recovery equipment to satisfy economic and environmental requirements. The anionic and nonionic emulsifiers generally employed in acrylic emulsion polymerization protect the soft, pressure-sensitive polymers from impact coalescence during the reaction and stabilize the latex for satisfactory mechanical and storage stability. However, the emulsifiers do have adverse effects on pressure sensitive adhesive properties. The emulsifiers employed in emulsion polymerization adversely effect water resistance, tack and adhesion properties of emulsion polymer adhesives.

Canadian Pat. No. 814,528, issued June 3, 1969, discloses low molecular weight alkali-soluble resins, resin cuts and methods for their preparation and purification. The resins are disclosed as being especially useful as emulsifiers, leveling agents and film-formers. The number-average molecular weight of the resins range from 700-5000; and the resins have acid numbers between 140 and 300. The resins are disclosed as emulsifiers in the preparation of emulsion polymers, resulting in emulsion polymers which are stable and substantially free from coagulum. For use as an emulsifier in such an emulsion polymerization reaction, the resins must have a number-average molecular weight between 1,000 and 2,000 and preferably between 1,000 and 1,500. Resins having a number-average molecular weight greater than 2,000 are said to result in unstable and coagulated emulsion polymers when used as the emulsifier in emulsion polymerization reactions.

The present invention provides advantages over known acrylic copolymer adhesives by providing an improved pressure-sensitive adhesive formulation having (a) fine particle-size emulsions, (b) emulsion viscosities which can be varied from low to high with no sacrifice in stability, (c) emulsion viscosities which are stable under high shear conditions encountered in roll-coating operations (Newtonian-like flow characteristics) and (d) low foam production which is desirable in roll-coating operations.

SUMMARY OF THE INVENTION

Briefly, in accordance with the present invention, an improved acrylic pressure-sensitive adhesive is prepared by using an acrylic emulsion polymer made in the presence of a polymeric resin. The acrylic emulsion polymer is a polymer containing one or more vinylic monomers wherein at least 40% by weight of the polymer is an alkyl acrylate. The polymeric support resin can be any alkali-soluble or alkali-dispersible polymer containing one or more vinylic monomers and having:

(a) a pH of greater than about 7 when dissolved or dispersed in aqueous media (i.e., the pH must be adjusted with a suitable alkali);
(b) at least about 6% by weight of a polymerizable carboxylic acid, an acid anhydride or an ester or partial ester of an inorganic acid, in the resin backbone;
(c) an acid number of at least about 30; and
(d) a number-average molecular weight of from about 1,000 to about 15,000.

The acrylic emulsion polymer adhesive of the present invention is prepared by an emulsion polymerization technique wherein the polymeric resin is employed as the emulsifying agent. However, minor amounts of traditional emulsifying agents may also be used.

In the preparation of the present acrylic emulsion polymers, the polymeric resin and alkaline materials—such as alkali metal hydroxides, amines, and/or ammonia—are added to a suitable reaction vessel with water to form a solution or dispersion of the polymeric resin therein. Optionally, a minor amount of a nonionic or anionic surfactant can be added to the reaction mixture. A minor amount, i.e. about 10%, of the premixed monomers employed in the acrylic polymer are added to the reaction vessel with agitation. A short time thereafter, i.e. 5–10 minutes, an initiator is added to the reaction mixture followed by the slow addition of the remaining monomer mixture over a 1-hour to 2-hour period.

The emulsion polymerization reaction is usually conducted under an inert atmosphere, i.e. nitrogen, and at an elevated temperature, i.e. 70°–105° C., when thermal initiators are employed. When redox initiators are employed, the reaction can be conducted at temperatures as low as about −3° C. The reaction mixture is maintained under sufficient agitation to thoroughly mix the components during the reaction. After the reaction, the acrylic emulsion polymer is typically filtered to remove large particles.

The acrylic emulsion polymer prepared according to the above-described procedure can be used "neat" as a pressure sensitive adhesive or can be admixed with standard pressure sensitive adhesive ingredients such as dyes, preservatives, tackifiers, perfumes, coalescing solvents and leveling aids.

Of particular interest in the practice of the present invention, an acrylic emulsion polymer is employed which contains from 40–90 weight percent 2-ethylhexyl acrylate (2-EHA), butyl acrylate (BA), isooctyl acrylate, isodecyl acrylate or mixtures thereof, made in the presence of a polymeric resin containing butyl acrylate and acrylic acid and having a number average (Mn) molecular weight in the range of 2,000–2,300.

The acrylic pressure sensitive adhesives according to the present invention have excellent flow, coating and leveling characteristics, especially on low-energy surfaces and on high speed equipment. The present acrylic emulsion polymers are characterized as having near Newtonian flow and are slightly translucent.

DETAILED DESCRIPTION OF THE INVENTION

In practicing the present invention, it is essential to employ an acrylic emulsion polymer containing at least about 40% by weight of an alkyl acrylate monomer which is polymerized in the presence of an alkali-soluble or alkali-dispersible polymeric support resin. The polymeric support resin-containing solution or dispersion must have:

(a) a pH of greater than about 7;
(b) at least about 6% by weight of a polymerizable carboxylic acid (acrylic acid, methacrylic acid), an acid anhydride (maleic anhydride) or an ester or a partial ester of an inorganic acid (sulfuric, phosphoric, sulfonic, phosphonic), in the resin backbone;
(c) an acid number for the polymeric resin of at least about 30; and
(d) a number-average molecular weight for the polymeric resin of from about 1,000 to about 15,000.

The polymeric support resin performs the function of an emulsifier typically utilized in a conventional emulsion polymerization method. The polymeric support resin thus serves as a surfactant or emulsifier and, optionally, can serve as the major amount of emulsifier; however, a minor amount of nonionic and/or anionic emulsifiers can also optionally be present in the emulsion polymerization reaction media of the invention. The support resin comprises one or more vinyl monomers, i.e. acrylic acid and esters and derivatives thereof, methacrylic acid and esters and derivatives thereof, styrene, alpha-methyl styrene, vinyl toluene, and combinations thereof, with the proviso that there must be at least about 6% by weight of a polymerizable carboxylic acid, an acid anhydride or an ester or a partial ester of an inorganic acid (an ester or a partial ester of sulfuric acid, phosphoric acid, sulfonic acid or phosphonic acid), in the resin backbone. Preferably there is at least about 6% by weight of acrylic acid (AA) or methacrylic acid (MA) in the resin backbone. The resin must be soluble or dispersible in an alkali solution; and when the support resin is added to the reaction mixture, the resin-containing reaction mixture must be kept at a pH of at least about 7. The resin must have an acid number of at least about 30, advantageously about 100–300 and preferably about 100–200. When used herein, the term "acid number", when referring to the support resin, indicates the number of milligrams (mg) of KOH required to neutralize one (1) gram of resin. The number-average (Mn) molecular weight of the polymeric support resin should be in a range of from about 1,000 to about 15,000, and advantageously from about 1,800 to about 3,600 and preferably from about 2,000 to about 2,300. The percentage of total solids the polymeric support resin represents in the final emulsion is from about 10 to about 40% by weight and preferably from about 25 to about 35% by weight.

The acrylic emulsion polymer component of the present adhesive represents from about 60 to about 90% by weight of the total solids. The term "solids" when used herein, refers to the total weight of non-volatile components. The acrylic emulsion polymer of the present invention is a polymer comprising one or more vinylic monomers wherein at least about 40% by weight of the polymer is an alkyl acrylate monomer or mixtures of alkyl acrylate monomers having an alkyl group with from 2 to 20, and preferably 4 to 10, carbon atoms. Preferred alkyl acrylate monomers include 2-ethylhexyl acrylate (2-EHA), butyl acrylate (BA), isooctyl acrylate (IOA), isodecyl acrylate (IDA), and combinations thereof.

The vinylic monomers employed in the acrylic emulsion polymer, in addition to alkyl acrylate, can be any vinylic monomer which does not reduce the pH of the reaction mixture to below about 7. These vinylic monomers are copolymerized with the alkyl acrylate to modify the properties of the resulting pressure-sensitive adhesives according to the end-use applications; and suitable vinylic monomers are readily determinable to one skilled in the art. For example, divinyl monomers can be used to increase the molecular weight and the internal strength of the polymer backbone; and such are generally employed in amounts less than about 7% by weight of the acrylic polymer. Suitable vinylic monomers employed in the practice of the present invention include butyl acrylate (BA), styrene (ST), alpha-methyl styrene (AMS), tetraethylene glycol diacrylate (TEGDA), hydroxyethyl methacrylate (HEMA), methyl methacrylate (MMA), ethyl acrylate (EA), methyl acrylate (MA), propyl acrylate (PA), propyl methacrylate (PMA), hexyl acrylate (HA), hexyl methacrylate (HMA), hexylethyl acrylate (HEA), vinyl acetate (VA), and combinations thereof.

The total solids of the acrylic emulsion polymer can vary from about 15 to about 60 weight percent, based on the total weight of the emulsion mixture. Advantageously, the total solids content is from about 30–58%, and preferably 48–53%, by weight.

The present acrylic emulsion polymers are prepared employing standard emulsion polymerization techniques, with the exception that the polymeric support resin is employed as the emulsifying agent or, alternatively, as the major portion of the emulsifying agent, i.e. a minor amount of a nonionic and/or an anionic emulsifier can also be employed in combination with the polymeric support resin. To prepare the present acrylic emulsion polymers, the support resin is admixed with about 90% of the water to be employed in the reaction. An alkaline material such as ammonia, alkali metal hydroxide, and/or amine, is added to the water and support resin to dissolve or disperse the support resin. The reaction is conducted at a temperature suitable for the initiator being employed, i.e. 70°–105° C. for thermal initiators and as low as −3° C. for redox initiators.

After the support resin has been dissolved in the water and this mixture is brought to reaction temperature, the minor amount of emulsifier, if employed, is then added to the reaction mixture. A minor portion of the vinylic monomer mixture is then added to the reaction mixture with agitation and held for a short period of time (5 to 10 minutes). The initiator, dissolved in the remaining water, is then added to the mixture of support resin and monomer with agitation and held for a short period of time, usually 5 to 20 minutes. The remaining monomer mixture is then slowly added to the reaction mixture over an extended period of time, usually from about ½ hour to about 2 hours. During the reaction, the reaction mixture is constantly maintained in an agitated state to provide a thorough mixing of components. The reaction is conducted under an inert atmosphere such as nitrogen. After the addition of the remaining monomer mixture, the reaction mixture is maintained at reaction temperature for an additional period of time, usually from about ½ hour to about 2 hours.

Thereafter, the resulting emulsion polymer is cooled to 25° C., filtered and stored in a suitable container.

The initiators employed in the emulsion polymerization reaction are not critical to the practice of the present invention. The initiator can be water-soluble or oil-soluble and can be a thermal initiator or a redox initiator. Any water soluble material that can generate a free radical is preferably used as the initiator. The free-radical initiators include various peroxygen compounds such as persulfates, tert-butyl hydroperoxide and similar peroxide catalysts. Still other suitable free-radical initiators include azo compounds, such as azobis-isobutylnitrile and dimethyl azobis-isobutyrate. Other suitable initiator systems include (1) alkali metal persulfate or ammonium persulfate, with or without reducing agents adapted to activate the sulfate, and (2) the oil-soluble initiator ditertiary butyl peroxide. The free-radical initiators are ordinarily present in the reaction at a level of from about 0.01 to about 2%, based upon total weight of the reaction mixture.

An emulsifying agent can optionally be added as a minor component of the emulsifier system in the present reaction. The particular emulsifying agent employed is not critical to the practice of the present invention. The standard emulsifiers used for emulsion polymerization processes are acceptable. The emulsifiers include nonionic and anionic surfactants. Mixtures of various surfactants can also be employed. Suitable nonionic surfactants include (1) ethylene oxide derivatives of alkylphenols, such as octylphenoxy polyethoxyethanol and nonylphenoxy polyethoxyethanol, both commercially available under the TRITON and SURFONIC brand names; (2) long chain ethoxylated alcohols such as linear or branched $C_6$-$C_{15}$ primary alcohol ethoxylates, commercially available under the NEODOL and ALFONIC brand names; (3) the PLURONIC series of block copolymeric surfactants which are commercially available from BASF Wyandotte; and (4) polyalkylene glycols, such as polypropylene glycol having an average molecular weight of from about 800 to about 2,000. A preferred nonionic emulsifier is a polypropylene glycol having an average molecular weight of about 1,200 and is commercially available from The Dow Chemical Company at POLYGLYCOL P-1200. Suitable anionic surfactants include (1) alkyl sulfates, such as lauryl sulfate; and (2) esters of sulfonated dicarboxylic acid, especially succinic acid. A preferred anionic surfactant is DOWFAX 2A1 brand sodium dodecyl diphenyloxide disulfonate, also commercially available from The Dow Chemical Company.

Once prepared, the present acrylic emulsion polymers can be used "neat" as pressure-sensitive adhesives. Alternatively, other pressure-sensitive adhesive ingredients can be added to the present acrylic emulsion polymers to provide a pressure sensitive adhesive with desired properties. These pressure sensitive adhesive ingredients include tackifiers, dyes, preservatives, leveling aids, coalescing solvents, perfumes, and the like. These operational ingredients are well known to one skilled in the art and are employed in concentrations readily determinable by one skilled in the art.

The PSA compositions of the present invention are used in any pressure-sensitive adhesive application. Such applications include, tapes, stickers, labels, decals, decorative (especially wood grain) vinyls, laminates, wall coverings and floor tiles. The present acrylic emulsion polymer PSAs have substantially Newtonian-like flow characteristics and have desirable flow, coating and leveling characteristics on low energy surfaces. Additionally, the present acrylic emulsion polymer PSAs are usable on high-speed equipment.

The following ingredients are admixed to prepare a preferred embodiment of the present invention:

| Ingredients | Weight % | |
|---|---|---|
| | Range | Preferred |
| Support resin (BA/AA, $M_n$ = 2,000–2,300) | 0.75–15 | 11–14 |
| Ammonia | 2–5 | 2–5 |
| Nonionic surfactant | 0.5–5 | 0.5–5 |
| Initiator | 0.01–2 | 0.01–2 |
| Monomer mixture (at least 40% 2-EHA) | 14.25–57 | 35–50 |
| Water | Balance | Balance |

In an especially preferred embodiment, the support resin comprises a BA/AA copolymer having an $M_n$ of between 2,000 and 2,300 and a BA/AA weight ratio of about 70/30, respectively; and the acrylic emulsion polymer comprises at least 70 weight percent 2-EHA in combination with any one or more of the following monomers: BA, ST, AMS, MMA, HEMA and up to about 7 percent by weight TEGDA.

The following examples illustrate the practice of the present invention but should not be construed as limiting its scope. All percentages are by weight unless specified otherwise.

EXAMPLE 1

The following ingredients were admixed according to the procedures described below to make an acrylic emulsion polymer pressure-sensitive adhesive of the present invention:

| PSA FORMULATION 1 | |
|---|---|
| Ingredients | Weight % |
| Support resin (solution resin BA(70%)/AA(30%); $M_n$ = 2,000) | 11.93 |
| Aqueous ammonia | 2.39 |
| POLYGLYCOL P-1200 brand polypropyleneglycol nonionic surfactant | 0.48 |
| Ammonium persulfate (APS) initiator | 0.25 |
| Monomer mixture MMA(10)/2-EHA(77)/BA(10)/TEGDA(3) | 35.81 |
| Deionized water | 49.14 |

The support resin, admixed with 90% of the deionized water, and all of the aqueous ammonia were charged to a 4-neck flask equipped with a reflux condenser, thermometer, stirrer, addition funnel and a nitrogen gas inlet. The reaction mixture was stirred and heated to 85° C. under a nitrogen atmosphere. When the temperature reached 85° C., the nonionic surfactant was added to the flask with moderate stirring (small vortex present) for 5 minutes. Ten percent (10%) of the monomer mixture was then added to the flask with moderate agitation for 5 minutes while maintaining a temperature of 85° C. The ammonium persulfate (APS) initiator was dissolved in the remaining deionized water and added to the flask with agitation. After a slight drop in temperature, the reaction temperature was brought back to 85° C. for 10 minutes. The remaining monomer mixture was fed into the flask over a one-hour period while maintaining a temperature of 85° C. After the monomer addition, the reaction mixture was maintained for one hour at 85° C. with moderate agitation. The reaction mixture was then quickly cooled to 25° C.; and the emulsion polymer was recovered.

The emulsion polymer of PSA Formulation 1 was then tested for adhesion properties according to routine standardized tests. No optional PSA ingredients were added to Formulation 1 to conduct these adhesion tests. Formulation 1 had a peel strength of 5 poounds per lineal inch (pli) (PSTC-1, modified for 24-hour dwell times), a shear of 500 minutes (PSTC-7), and a tack of 750 grams (A-1-1, on a Polyken Probe Tack tester).

EXAMPLE 2

Employing substantially the same procedures described in EXAMPLE 1, the following ingredients were employed to prepare PSA Formulation 2:

| PSA FORMULATION 2 | |
|---|---|
| Ingredients | Weight % |
| Support resin (solution resin BA(70)/AA(30); $M_n$ = 2,000–2,200) | 13.03 |
| Aqueous ammonia | 3.82 |
| Polypropylene glycol nonionic surfactant (POLYGLYCOL P-1200) | 0.61 |
| DOWFAX 2A1 anionic surfactant | 0.08 |
| Ammonium persulfate (APS) initiator | 0.27 |
| Monomer mixture MMA(10)/2-EHA(77)/BA(10)/TEGDA(3) | 39.08 |
| Deionized water | 43.11 |
| PSA Formulation 2 had the following adhesion properties: | |
| Peel | 3.6 pli |
| Shear | 900 min. |
| Tack | 600 grams (A-1-1) |

EXAMPLE 3

Employing substantially the same procedures described in EXAMPLE 1, the following ingredients were employed to prepare PSA Formulation 3:

| PSA FORMULATION 3 | |
|---|---|
| Ingredients | Weight % |
| Support resin (solution resin BA(70)/AA(30); $M_n$ = 2,000–2,200) | 11.97 |
| Aqueous ammonia | 2.39 |
| DOWFAX 2A1 anionic surfactant | 0.24 |
| APS initiator | 0.25 |
| Monomer mixture 2-EHA(77)/BA(10)/HEMA(10)/TEGDA(3) | 35.9 |
| Deionized water | 49.26 |
| PSA Formulation 3 had the following adhesion properties: | |
| Peel | 4.0 pli |
| Shear | 3500 min. |
| Tack | 500 grams (A-1-1) |

EXAMPLE 4

Employing substantially the same procedures described in EXAMPLE 1, the following ingredients were employed to prepare PSA Formulation 4:

| PSA FORMULATION 4 | |
|---|---|
| Ingredients | Weight % |
| Support resin (solution resin BA(65)/AA(20)/ST(15); $M_n$ = 2,000–2,200) | 9.95 |
| Aqueous ammonia | 2.23 |
| Polypropylene glycol nonionic surfactant (POLYGLYCOL P-1200) | 0.53 |
| APS initiator | 0.21 |
| Monomer mixture ST(31)/2-EHA(54.21)/MMA(7.22)/BA(7.22)/TEGDA(0.35) | 28.9 |
| Deionized water | 58.18 |
| PSA Formulation 4 had the following adhesion properties: | |
| Peel | 2.5 pli |
| Shear | 8000 min. |
| Tack | 20 grams (A-1-1) |

EXAMPLE 5

Employing substantially the same procedures described in EXAMPLE 1, the following ingredients were employed to prepare PSA Formulation 5:

| PSA FORMULATION 5 | |
|---|---|
| Ingredients | Weight % |
| Support resin (solution resin BA(70)/AA(30); $M_n$ = 2,000–2,300) | 11.94 |
| Aqueous ammonia | 2.39 |
| Polypropylene glycol nonionic surfactant (POLYGLYCOL P-1200) | 0.48 |
| APS initiator | 0.25 |
| Monomer mixture MMA(10)/2-EHA(77)/BA(10)/TEGDA(3) | 35.81 |
| Deionized water | 49.13 |
| PSA Formulation 5 had the following adhesion properties: | |
| Peel | 4.5 pli |
| Shear | 3800 min. |
| Tack | 500 grams (A-1-1) |

In similar operations, the various support resins and vinylic monomers described herein are employed in the preparation of acrylic emulsion polymer PSA compositions having desirable physical and mechanical properties.

Further examples of the present invention include the following.

EXAMPLE 6

Part 1 includes: 75 parts-by-weight polymeric resin, 283.4 parts-by-weight deionized water, 2.0 parts-by-weight DOWFAX 2A1 (an anionic surfactant), and 15 parts-by-weight ammonia. The resin, which has a number-average molecular weight of 2000, is 70 parts-byweight butyl acrylate and 30 parts-by-weight acrylic acid.

Part 2 includes: 2.5 parts-by-weight hydroxyethyl methacrylate, 2.5 parts-by-weight butyl acrylate, and 18.0 parts-by-weight 2-ethylhexyl acrylate.

Part 3 includes: 20.0 parts-by-weight hydroxyethyl methacrylate, 20.0 parts-by-weight butyl acrylate, 155.25 parts-by-weight 2-ethylhexyl acrylate, 6.75 parts-by-weight tetraethylene glycol diacrylate, and 4.5 parts-by-weight 20-mole ethoxylated methacrylate (a polyethoxylated hydroxyethyl methacrylate utilized as a co-polymerizable surfactant, commercially available from Alcolac Chemical Corp. of Baltimore, Md.).

Part 4 includes: 1.58 parts-by-weight ammonium persulfate (APS) initiator and 25 parts-by-weight deionized water.

Procedure

Step 1: Charge part 1 to a reaction flask equipped with the appropriate attachments. Heat to 75° C. under a nitrogen atmosphere and at moderate agitation.
Step 2: After the resin from step 1 is completely dissolved, add part 4 (i.e., the aqueous, initiator-containing solution).
Step 3: Mix for 5 minutes.
Step 4: Add part 2 (i.e., a first monomeric mixture).
Step 5: Mix for 5 minutes.
Step 6: Feed part 3 (i.e., a second monomeric mixture) into the reactor at a constant rate over a period of 90 minutes.
Step 7: Mix for an additional 60 minutes.
Step 8: Cool to 25° C. and filter the thus-produced emulsion.

EXAMPLE 7

Part 1 includes: 38.4 parts-by-weight resin, 2.78 parts-by-weight ammonia, 5.38 parts-by-weight sodium tridecyl ether sulfate (an anionic surfactant), 2.9 parts-by-weight ethoxylated nonylphenol (a nonionic surfactant, known as IGEPAL CO-730 brand surfactant, commercially available from GAF), and 198.4 parts-by-weight deionized water. The resin, which has a number-average molecular weight of 6,140 and a weight-average molecular weight of 25,850, is 10 parts-by-weight hydroxyethyl acrylate (HEA), 10 parts-by-weight acrylic acid, 60 parts-by-weight butyl acrylate, and 20 parts-by-weight 2-ethylhexyl acrylate.

Part 2 includes: 6 parts-by-weight methyl methacrylate and 4 parts-by-weight butyl acrylate.

Part 3 includes: 24.9 parts-by-weight methyl methacrylate, 33.34 parts-by-weight butyl acrylate, and 133.35 parts-by-weight 2-ethylhexyl acrylate.

Part 4 includes: 0.6 parts-by-weight ammonium persulfate (APS) initiator dissolved in 72.4 parts-by-weight deionized water.

Procedure

Step 1: Charge a reaction flask that is equipped with the appropriate attachments with part 1. Heat to 80° C. under a nitrogen atmosphere and at moderate agitation.
Step 2: After the resin in step 1 is completely dissolved, add part 2 (i.e., a first monomeric mixture).
Step 3: Mix for 5 minutes.
Step 4: Add part 4 (i.e., aqueous, initiator-containing solution) at a constant rate over a period of 10 minutes.
Step 5: Mix for an additional 10 minutes.
Step 6: Feed part 3 (i.e., a second monomeric mixture) into the reactor at a constant rate over a period of 120 minutes.
Step 7: Mix for an additional 45 minutes.
Step 8: Cool to 25° C., and filter the thus-produced emulsion.

EXAMPLE 8

The emulsion of EXAMPLE 8 is produced much like the emulsion of EXAMPLE 7 except that the resin composition is: 10 parts-by-weight exoxyethoxy ethyl acrylate, 10 parts-by-weight acrylic acid, 60 parts-by-weight butyl acrylate, and 20 parts-by-weight 2-ethylhexyl acrylate. Such a resin has a number-average molecular weight of 7,210 and a weight-average molecular weight of 24,470.

EXAMPLE 9

The emulsion of EXAMPLE 9 is produced much like the emulsion of EXAMPLE 7, except for the following changes.

Part 1 includes: 38.4 parts-by-weight resin, 3.43 parts-by-weight ammonia, 5.38 parts-by-weight sodium tridecyl ether sulfate, 2.9 parts-by-weight IGEPAL CO-730, and 197.7 parts-by-weight deionized water. The resin, which has a number-average molecular weight of 5,990 and a weight-average molecular weight of 21,970, is 12.5 parts-by-weight acrylic acid, 65.6 parts-by-weight butyl acrylate, and 21.9 parts-by-weight 2-ethylhexyl acrylate.

TESTING OF ADHESIVE PROPERTIES

After the thus-produced emulsions of each of EXAMPLES 6–9 were filtered, the adhesive properties of each such emulsion was then determined as follows.

Adhesive-Testing Procedure

An aliquot sample of each such emulsion was placed at the top of a 2-mil thick polyethylene terephthalate (PET) sheet. The PET sheet measured 8"×11". The sample was then spread over the sheet using a #26 rod. The thus-spread adhesive sample was then placed in a 120° C. oven for 5 minutes to dry. After the sample was removed from the oven and allowed to cool, a sheet of "Mead R-Coat" brand release liner was placed over the thus-dried emulsion film, thereby forming a construction for further testing. Such a "construction" is hereinafter referred to as a "tape". Sample 6 was drawn down using a 2-mil Bird Bar. The sample was then dried at 140° F. for 5 minutes. No release liner was used in the construction of this tape. Test samples that were one-inch wide were then cut from the tape for adhesive-testing evaluation, as determined from PSTC-1 and Polyken Probe Tack values.

| Examples | PSTC-1 Adhesive Evaluation | | Tack Values |
|---|---|---|---|
| | Values | (Residence) | |
| 6 | 3.76 pli | (24 hrs.) | 530 |
| 7 | 2.85 pli | (30 min.) | 743 |
| 8 | 2.81 pli | (30 min.) | 930 |
| 9 | 2.93 pli | (30 min.) | 626 |

The PSTC-1 values are expressed in pounds per linear inch and the Polyken Probe Tack values are expressed in grams per square centimeter.

Each of the adhesives of EXAMPLES 6–9 would be suitable as a permanent-type, pressure-sensitive adhesive.

Additional pressure-sensitive adhesives, in accordance with the principles of the present invention, would be produced as follows.

For example, one such method for preparing a polymer emulsion that can be utilized as a pressure-sensitive adhesive comprises the following steps. In an agitated reaction vessel, an alkali-soluble or alkali-dispersible polymeric resin is combined with water and an effective amount of an alkaline material for forming either a resin-containing alkaline solution or a resin-containing alkaline dispersion. At least about six (6) weight percent up to about thirty (30) weight percent of the polymeric resin is prepared from monomers selected from the group consisting of a polymerizable carboxylic acid, a polymerizable acid anhydride, and a polymerizable ester or a polymerizable partial ester of an inorganic ester. The polymeric resin further includes a polymerizable vinyl monomer selected from the group consisting of acrylic acid esters and derivatives thereof, methacrylic acid esters and derivatives thereof, styrene, alpha-methyl styrene, vinyl toluene, and combinations thereof.

The method includes subjecting the agitated reaction vessel contents to an inert atmosphere and maintaining the agitated reaction vessel contents at a predetermined reaction temperature.

The method further comprises adding to the agitated reaction vessel an emulsion-polymerization initiator and, a predetermined time thereafter, further adding to the agitated reaction vessel a portion of an emulsion-polymerizable monomer mixture. The relative amounts of initiator and monomer mixture are effective for initiating emulsion-polymerization of the emulsion-polymerizable monomer mixture in the presence of the polymeric resin. At least about forty (40) weight percent of the emulsion-polymerizable monomer mixture is selected from the group consisting of at least one alkyl acrylate monomer having an alkyl group with from two (2) to twenty (20) carbon atoms, styrene, alpha-methyl styrene, tetraethylene glycol diacrylate, hydroxyethyl methacrylate, methyl methacrylate, propyl methacrylate, hexyl methacrylate, vinyl acetate, and combinations thereof.

The method includes, a predetermined time thereafter, further adding to the agitated reaction vessel, over a predetermined time period, the remainder of the emulsion-polymerizable monomer mixture.

The method further includes, thereafter, maintaining the agitated reaction vessel contents at the predetermined reaction temperature for a predetermined time period, for producing a polymer emulsion that can be utilized as a pressure-sensitive adhesive.

As yet another example, another such method for preparing a polymer emulsion that can be utilized as a pressure-sensitive adhesive, in accordance with the principles of the present invention, comprises the following steps.

In an agitated reaction vessel, an alkali-soluble or an alkali-dispersible polymeric resin is combined with water and an effective amount of an alkaline material for forming either a resin-containing alkaline solution or a resin-containing alkaline dispersion. At least about six (6) weight percent up to about thirty (30) weight percent of the polymeric resin is prepared from monomers selected from the group consisting of a polymerizable carboxylic acid, a polymerizable acid anhydride, and a polymerizable ester or a polymerizable partial ester of an inorganic acid. The polymeric resin further includes a polymerizable vinyl monomer selected from the group consisting of acrylic acid esters and derivatives thereof, methacrylic acid esters and derivatives thereof, styrene, alpha-methyl styrene, vinyl toluene, and combinations thereof.

The method includes subjecting the agitated reaction vessel contents to an inert atmosphere and maintaining the agitated reaction vessel contents at a predetermined reaction temperature.

The method further comprises adding to the agitated reaction vessel an emulsion polymerization initiator and, a predetermined time thereafter, further adding to the agitated reaction vessel an emulsion-polymerizable monomer mixture. The relative amounts of initiator and monomer mixture are effective for initiating emulsion-polymerization of the emulsion-polymerizable monomer mixture in the presence of the polymeric resin. At least about forty (40) weight percent of the emulsion-polymerizable monomer mixture is selected from the group consisting of at least one alkyl group with from two (2) to twenty (20) carbon atoms, styrene, alpha-methyl styrene, tetraethylene glycol diacrylate, hydroxyethyl methacrylate, methyl methacrylate, propyl methacrylate, hexyl methacrylate, vinyl acetate, and combinations thereof.

The method further includes, thereafter, maintaining the agitated reaction vessel contents at the predetermined reaction temperature for a predetermined time period, for producing a polymer emulsion that can be utilized as a pressure-sensitive adhesive.

What has been described herein are novel pressure-sensitive adhesives as well as methods for the production thereof. While the present invention has been described with reference to several preferred embodiments, the present invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

I claim:

1. A method for preparing a polymer emulsion that can be uitilized as a pressure-sensitive adhesive, the method comprising the steps of:

combining, in an agitated reaction vessel, an alkali-soluble or an alkali-dispersible polymeric resin with water and an effective amount of an alkaline material for forming either a resin-containing alkaline solution or a resin-containing alkaline dispersion, wherein at least about 6 weight percent up to about 30 weight percent of the polymeric resin is prepared from monomers selected from the group consisting of a polymerizable carboxylic acid, a polymerizable acid anhydride, and a polymerizable ester or a polymerizable partial ester of an inorganic acid, and wherein the polymeric resin further includes a polymerizable vinyl monomer selected from the group consisting of acrylic acid esters and derivatives thereof, methacrylic acid esters and derivatives thereof, styrene, alpha-methyl styrene, vinyl toluene, and combinations thereof;

subjecting the agitated reaction vessel contents to an inert atmosphere and maintaining the agitated reaction vessel contents at a predetermined reaction temperature;

adding to the agitated reaction vessel an emulsion-polymerization initiator and, a predetermined time thereafter, further adding to the agitated reaction vessel one of a first emulsion-polymerizable monomer mixture and a second emulsion-polymerizable monomer mixture, wherein the relative amounts of initiator and said one of the first and second emulsion-polymerizable monomer mixtures are effective for initiating emulsion-polymerization of said one monomer mixture in the presence of the polymeric resin, and wherein at least about 40 weight percent of each of the first and second monomer mixtures is selected from the group consisting of at least one alkyl acrylate monomer having an alkyl group with from 2 to 20 carbon atoms, styrene, alpha-methyl styrene, tetraethylene glycol diacrylate, hydroxyethyl methacrylate, methyl methacrylate, propyl methacrylate, hexyl methacrylate, vinyl acetate, and combinations thereof;

and, a predetermined time thereafter, further adding to the agitated reaction vessel, over a predetermined time period, the other of the first and second emulsion-polymerizable monomer mixtures; and thereafter, maintaining the agitated reaction vessel contents at the predetermined reaction temperature for a predetermined time period, for producing a polymer emulsion that can be utilized as a pressure-sensitive adhesive.

2. The method of claim 1 wherein said one of the first and second emulsion-polymerizable monomer mixtures comprises 2.5 parts-by-weight hydroxyethyl methacrylate, 2.5 parts-by-weight butyl acrylate, and 18 parts-by-weight 2-ethylhexyl acrylate, and wherein said other of the first and second emulsion-polymerizable monomer mixtures comprises 20.0 parts-by-weight hydroxyethyl methacrylte, 20.0 parts-by-weight butyl acrylate, 155.25 parts-by-weight 2-ethylhexyl acrylate, and 6.75 parts-by-weight tetraethylene glycol diacrylate.

3. The polymer emulsion, utilizable as a pressure-sensitive adhesive, prepared in accordance with the method of claim 1.

4. A method for preparing a polymer emulsion that can be utilized as a pressure-sensitive adhesive, the method comprising the steps of:

combining, in an agitated reaction vessel, an alkali-soluble or an alkali-dispersible polymeric resin with water and an effective amount of an alkaline material for forming either a resin-containing alkaline solution or a resin-containing alkaline dispersion, wherein at least about 6 weight percent up to about 30 weight percent of the polymeric resin is prepared from monomers selected from the group consisting of a polymerizable carboxylic acid, a polymerizable acid anhydride, and a polymerizable ester or a polymerizable partial ester of an inorganic acid, and wherein the polymeric resin further includes a polymerizable vinyl monomer selected from the group consisting of acrylic acid esters and derivatives thereof, methacrylic acid esters and derivatives thereof, styrene, alpha-methyl styrene, vinyl toluene, and combinations thereof;

subjecting the agitated reaction vessel contents to an inert atmosphere and maintaining the agitated reaction vessel contents at a predetermined reaction temperature;

adding to the agitated reaction vessel one of a first emulsion-polymerizable monomer mixture and a second emulsion-polymerizable monomer mixture and thereafter adding an effective amount of an initiator for initiating emulsion-polymerization of said one monomer mixture in the presene of the polymeric resin, wherein at least about 40 weight percent of each of said first and second emulsion-polymerizable monomer mixtures is selected from the group consisting of at least one alkyl acrylate monomer having an alkyl group with from 2 to 20 carbon atoms, styrene, alpha-methyl styrene, tetraethylene glycol diacrylate, hydroxyethyl methacrylate, methyl methacrylate, propyl methacrylate, hexyl methacrylate, vinyl acetate, and combinations thereof;

then adding to the agitated reaction vessel, over a predetermined time period, the other of the first and second emulsion-polymerizable monomer mixtures; and thereafter, maintaining the agitated reaction vessel contents at the predetermined reaction temperature for a predetermined time period, for producing a polymer emulsion that can be utilized as a pressure-sensitive adhesive.

5. The method of claim 4 wherein said one of the first and second emulsion-polymerizable monomer mixtures comprises 6 parts-by-weight methyl methacrylate and 4 parts-by-weight butyl acrylate, and wherein said other of the first and second emulsion-polymerizable monomer mixtures comprises 24.9 parts-by-weight methyl methacrylate, 33.34 parts-by-weight butyl acrylate, and 133.35 parts-by-weight 2-ethylhexyl acrylate.

6. The polymer emulsion, utilizable as a pressure-sensitive adhesive, produced in accordance with the method of claim 4.

7. A method for preparing a polymer emulsion that can be utilized as a pressure-sensitive adhesive, the method comprising the steps of:

combining, in an agitated reaction vessel, an alkali-soluble or an alkali-dispersible polymeric resin with water and an effective amount of an alkaline material for forming either a resin-containing alkaline solution or a resin-containing alkaline dispersion, wherein at least about 6 weight percent up to about 30 weight percent of the polymeric resin is prepared from monomers selected from the group consisting of a polymerizable carboxylic acid, a polymerizable acid anhydride, and a polymerizable ester or a polymerizable partial ester of an inorganic acid, and wherein the polymeric resin further includes a polymerizable vinyl monomer selected from the group consisting of acrylic acid esters and derivatives thereof, methacrylic acid esters and derivatives thereof, styrene, alpha-methyl styrene, vinyl toluene, and combinations thereof;

subjecting the agitated reaction vessel contents to an inert atmosphere and maintaining the agitated reaction vessel contents at a predetermined reaction temperature;

adding to the agitated reaction vessel an emulsion-polymerization initiator and, a predetermined time thereafter, further adding to the agitated reaction vessel a portion of an emulsion-polymerizable monomer mixture, wherein the relative amounts of initiator and monomer mixture are effective for initiating emulsion-polymerization of the emulsion-polymerizable monomer mixture in the presence of the polymeric resin, and wherein at least about 40 weight percent of the emulsion-polymerizable monomer mixture is selected from the group consisting of at least one alkyl acrylate monomer having an alkyl group with from 2 to 20 carbon atoms, styrene, alpha-methyl styrene, tetraethylene glycol diacrylate, hydroxyethyl methacrylate, methyl methacrylate, propyl methacrylate, hexyl methacrylate, vinyl acetate, and combinations thereof;

and, a predetermined time thereafter, further adding to the agitated reaction vessel, over a predetermined time period, the remainder of the emulsion-polymerizable monomer mixture; and thereafter, maintaining the agitated reaction vessel contents at the predetermined reaction temperature for a predetermined time period, for producing a polymer emulsion that can be utilized as a pressure-sensitive adhesive.

8. A method for preparing a polymer emulsion that can be utilized as a pressure-sensitive adhesive, the method comprising the steps of:

combining, in an agitated reaction vessel, an alkali-soluble or an alkali-dispersible polymeric resin with water and an effective amount of an alkaline material for forming either a resin-containing alkaline solution or a resin-containing alkaline dispersion, wherein at least about 6 weight percent up to about 30 weight percent of the polymeric resin is prepared from monomers selected from the group consisting of a polymerizable carboxylic acid, a polymerizable acid anhydride, and a polymerizable ester or a polymerizable partial ester of an inorganic acid, and wherein the polymeric resin further includes a polymerizable vinyl monomer selected from the group consisting of acrylic acid esters and derivatives thereof, methacrylic acid esters and derivatives thereof, styrene, alpha-methyl styrene, vinyl toluene, and combinations thereof;

subjecting the agitated reaction vessel contents to an inert atmosphere and maintaining the agitated reaction vessel contents at a predetermined reaction temperature;

adding to the agitated reaction vessel an emulsion polymerization initiator and, a predetermined time thereafter, further adding to the agitated reaction vessel an emulsion-polymerizable monomer mixture, wherein the relative amounts of initiator and monomer mixture are effective for initiating emulsion-polymerization of the emulsion polymerizable monomer mixture in the presence of the polymeric resin, and wherein at least about 40 weight percent of the emulsion-polymerizable monomer mixture is selected from the group consisting of at least one alkyl acrylate monomer having an alkyl group with from 2 to 20 carbon atoms, styrene, alpha-methyl styrene, tetraethylene glycol diacrylate, hydroxyethyl methacrylate, methyl methacrylate, propyl methacrylate, hexyl methacrylate, vinyl acetate, and combinations thereof; and thereafter, maintaining the agitated reaction vessel contents at the predetermined reaction temperature for a predetermined time period, for producing a polymer emulsion that can be utilized as a pressure-sensitive adhesive.

* * * * *

UNITED STATES PATENT AND TRADEMARK OFFICE
CERTIFICATE OF CORRECTION

PATENT NO.   :   4,923,919

DATED        :   May 8, 1990

INVENTOR(S)  :   Glenn R. Frazee

It is certified that error appears in the above-identified patent and that said Letters Patent is hereby corrected as shown below:

At col. 5, line 64, please delete the word "at" and substitute the word -- as -- in place thereof.

At col. 7, line 27, please delete "poounds" and substitute the word -- pounds -- in place thereof.

At col. 10, line 11, please delete "exoxyethoxy" and substitute the word -- ethoxyethoxy -- in place thereof.

In claim 1, namely, at col. 12, line 48, please delete "uitilized" and substitute the word -- utilized -- in place thereof.

In claim 2, namely, at col. 13, line 39, please delete "methacrylte" and substitute the word -- methacrylate -- in place thereof.

In claim 4, namely, at col. 14, line 6, please delete "presene" and substitute the word -- presence -- in place thereof.

Signed and Sealed this

Third Day of December, 1991

Attest:

HARRY F. MANBECK, JR.

*Attesting Officer*          *Commissioner of Patents and Trademarks*